INTERFERENCE LIMITERS

Filed Dec. 12, 1955 2 Sheets-Sheet 1

Inventor
Donald H. Fisher
By Holcombe, Wetherill & Brisebois
Attorneys

INTERFERENCE LIMITERS

Filed Dec. 12, 1955 2 Sheets-Sheet 2

Inventor
Donald H. Fisher
By Holcomb, Wetherill & Brisebois
Attorneys

United States Patent Office 2,978,539
Patented Apr. 4, 1961

2,978,539

INTERFERENCE LIMITERS

Donald Henry Fisher, Cambridge, England, assignor to Pye Limited, Cambridge, England, a British company Filed Dec. 12, 1955, Ser. No. 552,593

Claims priority, application Great Britain Dec. 16, 1954

9 Claims. (Cl. 178—7.5)

The present invention relates to interference limiters and more particularly to circuit arrangements for limiting impulsive interference on a received television waveform.

Impulsive interference may be troublesome in both positive modulation television systems, such as the British 405 line system and in negative modulation systems such as the American 525 line system. In positive modulation systems pulses from comparatively weak interference produce a high beam current in the reproducing cathode ray tube and consequently bright white spots on the reproduced picture. In negative modulation systems interference pulses are liable to upset synchronisation of the time bases.

One method of clipping or limiting these interference pulses in a television receiver which employs a pentode or a valve having a similar anode voltage/grid voltage characteristic as video amplifier, is by adjusting the operating characteristic of this valve so that the part of the video waveform applied to the control grid which bears the interference pulses lies just above the lower knee voltage on the anode voltage/grid voltage characteristic curve or just below the upper knee voltage on this curve whereby any further excursion in the direction of the interference pulses is severely limited or clipped.

With such an arrangement however, any increase in contrast will result in clipping of the peak white portions of the positive modulation waveform, whether the video amplifier is A.C. coupled or D.C. coupled; and clipping of the synchronising pulses in the negative modulation waveform.

The present invention consists in a circuit arrangement employing the knee on the anode voltage/grid voltage curve of a pentode or other valve having a similar anode voltage/grid voltage characteristic and acting as video amplifier for limiting impulsive interference, in which means are provided for maintaining the clipping level substantially constant as the contrast is altered.

According to a feature of the invention, the arrangement includes an automatic gain control circuit which operates in conjunction with, or under the influence of the output from the video amplifier functioning as the interference limiter, so as to maintain the clipping level of of the interference limiter substantially constant.

According to a further feature of the invention, the contrast of the received signal is altered by varying the D.C. voltage to the anode or one of the other electrodes of the video amplifier; the output of the video amplifier being applied to an automatic gain control circuit which is arranged to compensate for the change in clipping level of the input signal to the video amplifier caused by variation of the contrast.

In one arrangement according to the invention, for use with television signals employing positive modulation, a television receiver includes an automatic gain control circuit for controlling the gain of the amplifying channel for the received television waveform, and means are provided for altering the anode voltage of the pentode or similar valve acting as video amplifier to alter the contrast of the reproduced picture and for feeding variation in the anode voltage to alter the reference voltage of the automatic gain control circuit in such a direction that the white level of the waveform is kept substantially constant as the contrast is altered. Thus, when the contrast is varied, the synchronising pulses will be shifted relative to the anode voltage/grid voltage curve of the video amplifier and peak white remains at substantially the same level as the knee potential of the curve. Preferably, the alterations in the anode voltage of the pentode or similar valve are also applied to the grid or cathode of the cathode ray tube so that the picture black level is maintained at all contrast settings.

In another arrangement according to the invention, for use with television signals employing negative modulation, the detector output of a television receiver is fed through the video amplifier to an automatic gain control circuit arranged to measure the tips of the synchronising pulses. The contrast of the reproduced picture is varied by altering the grid voltage of the video amplifier thereby altering the base level of the signal at the grid and anode, which alteration is in turn reset by the automatic gain control voltage resetting the signal level fed by the radio frequency or intermediate frequency stages of the receiver to the detector feeding the video amplifier.

In order that the invention may be more fully understood, reference will now be made to the accompanying drawings in which.

Figure 1:
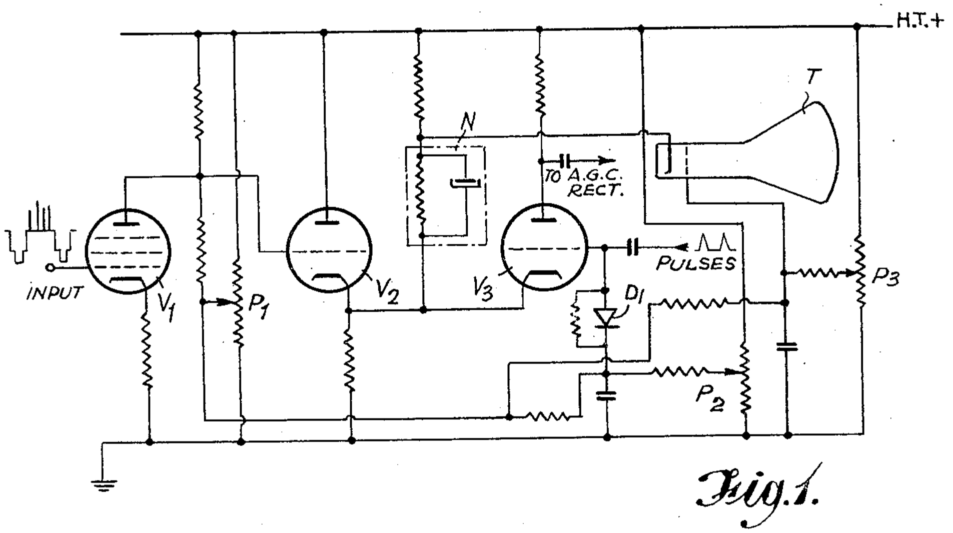
Figure 1 is a circuit diagram of part of a television receiver including a circuit arrangement according to the invention.

Referring to Figure 1, which shows an arrangement for use with positive modulation systems, a pentode video amplifier V1 is operated so that the knee on the anode voltage/grid voltage curve serves to limit impulsive interference and feeds its output via a cathode follower V2 to the cathode of a cathode ray tube T. The cathode of the cathode follower V2 is also connected to the cathode of an automatic gain control valve V3, to the grid of which are fed sampling pulses for sampling the television waveform appearing at the cathode of V3 during black level periods. The sampling pulses may be derived from the line time base of the receiver and are restored to a constant amplitude by means of the D.C. restorer device D1. The arrangement is such that V3 conducts during the sampling pulses to produce a pulse voltage at its anode which is rectified and smoothed to provide the automatic gain control voltage. The amplitude of the pulses at the anode of valve V3 varies with changes in the black level voltage of the received signal and also depends on the standing grid bias on V3.

The anode potential of video amplifier V1 may be raised or lowered to alter the contrast of the reproduced picture on the cathode ray tube T, by adjusting the tapping on the potentiometer P1, connected across a positive supply voltage. The voltage at the tapping on this potentiometer P1 is also applied to the grid of valve V3, which in addition is fed with a D.C. voltage derived from the potentiometer P2 also connected across a positive voltage supply. Potentiometer P2 is used for initially setting up the circuit.

If the grid reference voltage of valve V3 were fixed by the voltage derived, from P2 alone, it would tend to maintain the black level constant as the potentiometer P1 were adjusted to alter the contrast and consequently the white level would fall as the voltage at the top of potentiometer P1 was increased and vice versa. However, by connecting a fraction of the voltage at the top of potentiometer P1 to the grid of the valve V3, the relative variations of the voltages applied to valve V3 may be arranged so that the white level of the signal remains substantially constant with variations in contrast. The grid of the cathode ray tube is connected to potentiometer P3 serving as a brightness control and is also fractionally coupled to the tapping of potentiometer P1 so that the picture black level is maintained at all settings of the contrast control.

If desired the D.C. loss network N may be inserted in the cathode load of the cathode ray tube.

Figure 2:
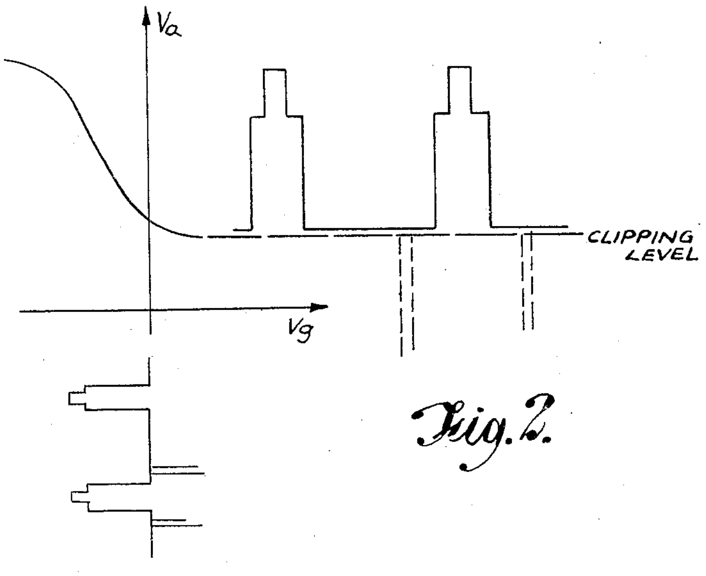
Figure 2 is an explanatory waveform diagram.

Figure 2 shows the operating characteristics of the pentode video amplifier V1, in which the peak white portion of the video waveform lies just above the knee voltage of the anode voltage/grid voltage curve and any further excursion beyond peak white, as is caused by impulsive interference, is severely limited.

Figure 3:
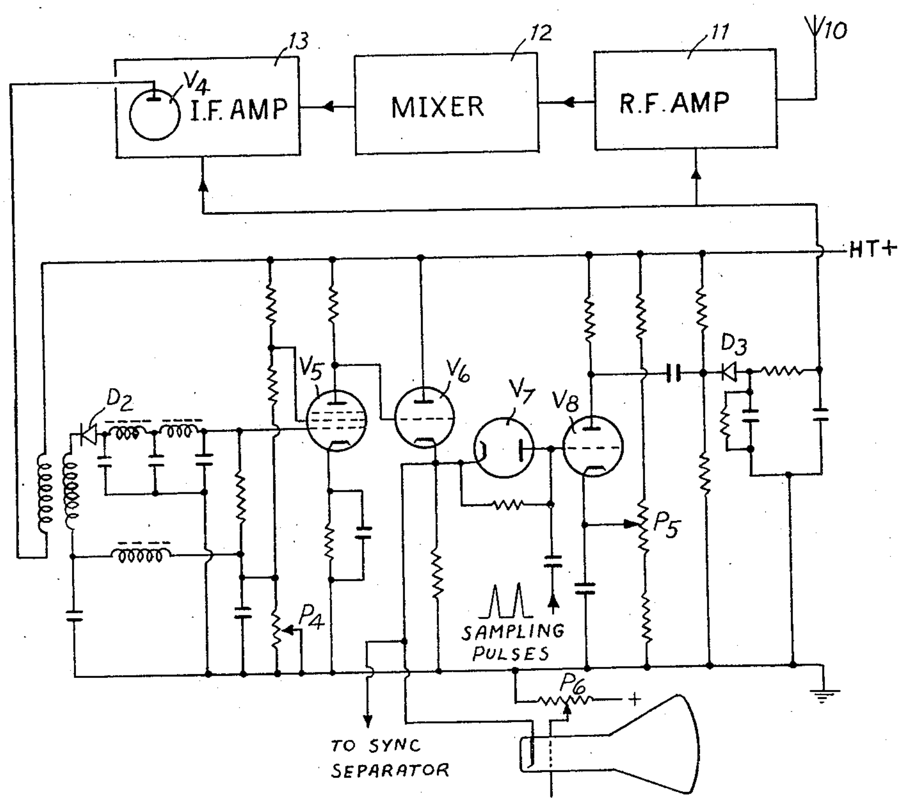
Figure 3 is a circuit diagram of another embodiment of the invention.

Referring now to Figure 3, this embodiment shows partly in block-diagram form, but with the part of the circuit according to the present invention shown specifically, a television receiver intended to receive negative modulated television signals. The incoming signals are fed from the aerial 10 through the R.F. amplifier 11, and the mixer 12, to the I.F. amplifier 13. The final valve V4 of the I.F. amplifier 13, feeds a detector circuit D2, the return of which is biased positively by potentiometer P4. The output from the detector D2 feeds the video amplifer V5, which consists of a pentode valve operated so that the upper bend on the anode voltage/grid voltage characteristic serves to cut-off the impulsive interference on the synchronising pulses. The output from the video amplifier V5 is fed through the cathode follower V6 whose output is fed to the cathode of a cathode ray tube T2. The grid of the cathode ray tube is connected to the brightness control potentiometer P6. The output from the cathode follower is also fed to the synchronising separator stage (not shown) and to an automatic gain control circuit comprising a sampling rectifier V7, an amplifier V8 and a smoothing rectifier D3. This automatic gain control circuit may be constructed as described in my copending application Serial No. 407,106, filed January 11, 1954, Patent No. 2,875,277, issued February 24, 1959.

Positive sampling pulses, which may be derived from the line time base of the receiver (not shown), are timed to occur during the synchronizing pulses of the video waveform and hence measure the synchronizing pulse tips. The potentiometer P5 is employed to set up the valve V8 to work on the correct part of its characteristic For any given set of signal conditions, the automatic gain control circuit fixes the signal amplitude, maintaining the tips of the synchronising pulses at constant level. Potentionmeters P4 and P5 can then be adjusted to keep the same signal output, but with the bias due to potentiometer P4 on valve V5 adjusted so that the synchronising tips are close to cut off.

If a change of contrast is then required potentiometer P4 is altered changing the base level of the signal at V5 grid and anode. The automatic gain control circuit accordingly resets the signal level and maintains the synchronising tips near to the cut-off of valve V5.

Figure 4:
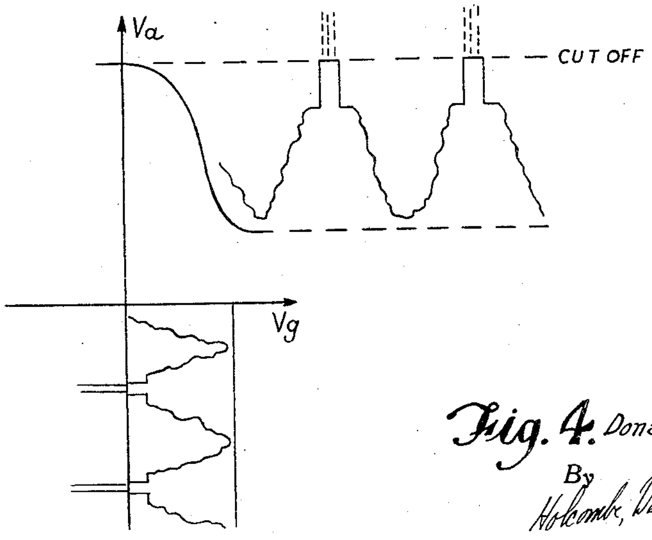
Figure 4 is an explanatory waveform diagram.

Figure 4 shows the dynamic anode voltage/grid vlotage characteristic of the pentode video amplifier V5, in which the peaks of the synchronising pulses lie just below the upper knee voltage on the curve, whereby any further excusion caused by interference pulses takes the valve beyond cut-off. It will thus be seen that the circuit produces nearly constant black level for negative modulation system and the nearness of the tips of the synchronising pulses to the cut-off potential of valve V5 maintains a high degree of immunity to impulsive interference. Furthermore, since the waveform fed to the synchronising separator stage is derived from the cathode follower V6 which itself is fed from the video amplifier V5; this waveform will be substantially free from interference on the synchronising pulses, thereby assisting satisfactory operation of the synchronising separator stage and of the time-bases.

Whilst particular embodiments have been described, it will be understood that various modifications may be made without departing from the scope of this invention. For example other types of automatic gain control circuit may be employed, in place of these specifically described.

I claim:

1. In a television receiver, a circuit arrangement for amplitude limiting impulsive interference on a received television waveform, which interference extends beyond the useful modulation on the waveform, comprising a video amplifier valve having an anode voltage/grid voltage characteristic similar to that of a pentode, a high tension supply, means for applying potentials from said high tension supply to said valve enabling said valve to employ that characteristic to operate as a limiter for limiting impulsive interference on the received television waveform to a certain level as well as to produce an output video signal, means connecting a contrast control to said high tension supply which operates to alter the potential applied to an electrode of said video amplifier valve, an automatic gain control circuit fed with the output video signal from said video amplifier valve, and means for deriving an output voltage from said automatic gain control circuit and varying with alteration of the contrast control for compensating for changes in the limiting level of said video amplifier caused by alterations in the contrast control.

2. In a television receiver, a circuit arrangement for amplitude limiting impulsive interference on a received television waveform, which interference extends beyond the useful modulation on the waveform, comprising a pentode video amplifier valve, a high tension supply, means for applying potentials from said high tension supply to said valve enabling said valve also to operate as a limiter for limiting impulsive interference on the received television waveform to a certain level, by employing the knee on its anode voltage/grid voltage characteristic as well as to produce an output video signal, means connecting a contrast control to said high tension supply which operates to alter the potential applied to an electrode of said video amplifier valve, an automatic gain control circuit fed with the output video signal from said video amplifier valve, and means for deriving an output voltage from said automatic gain control circuit and varying with alteration of the contrast control for compensating for changes in the limiting level of said video amplifier, caused by alterations in the contrast control.

3. In a television receiver, a circuit arrangement for amplitude limiting impulsive interference on a received television waveform, which interference extends beyond the useful modulation on the waveform, comprising a video amplifier valve having an anode voltage/grid voltage characteristic similar to that of a pentode, a high tension supply, means for applying potentials from said high tension supply to said valve enabling said valve to employ that characteristic to operate as a limiter for limiting impulsive interference on the received television waveform to a certain level as well as to produce an output video signal, means connecting a contrast control to said high tension supply which operates to alter a potential applied to said video amplifier valve, an automatic gain control circuit fed with the output signal from said video amplifier valve and including means for sampling a part of the received television waveform of which the amplitude varies solely in proportion to changes in signal strength, and means for deriving an automatic gain control voltage from said sampled portions and varying with alteration of the contrast control for compensating for changes in the limiting level of said video amplifier caused by said alterations in the contrast control.

4. In a television receiver, a circuit arrangement for amplitude limiting impulsive interference on the received television waveform, which interference extends beyond the useful white level modulation on the waveform, comprising a video amplifier valve having an anode voltage/grid voltage characteristic similar to that of a pentode, a high tension supply, means for applying potentials from said high tension supply to said valve enabling said valve to employ that characteristic to operate as a limiter for limiting said impulse interference on the television waveform to a certain level as well as to produce an output video signal, an automatic gain control circuit fed with the output signal from said video amplifier and including means for sampling said television waveform during a part of the signal of which the amplitude varies solely in proportion to changes in the signal strength and means for deriving an automatic gain control voltage from said sampled portions, means connecting a contrast control to said high tension supply which operates to vary a D.C. voltage applied to said video amplifier and means for feeding variations in the D.C. voltage applied to said video amplifier to alter the reference voltage applied to the automatic gain control circuit such that the white level of the waveform at the input to the video amplifier is kept substantially constant as the contrast is altered.

5. In a television receiver, a circuit arrangement for amplitude limiting impulsive interference on the received television waveform, which interference extends beyond the useful white level modulation of the waveform comprising a video amplifier tube having an anode voltage/grid voltage characteristic similar to that of a pentode, a high tension supply, means for applying potentials from said high tension supply to said valve enabling said valve to employ that characteristic to operate as a limiter for limiting said impulse interference on the television waveform to a certain level as well as to produce an output video signal, an automatic gain control circuit fed with the output signal from said video amplifier and including means for sampling said television waveform during the black level periods and means for deriving an automatic gain control voltage from said sampled portions, means connecting a contrast control to said high tension supply which operates to vary the D.C. anode voltage applied to said video amplifier and means for feeding variations in the D.C. anode voltage applied to said video amplifier to alter the reference voltage applied to the automatic gain control circuit such that the white level of the waveform at the input of the video amplifier is kept substantially constant as the contrast is altered.

6. In a television receiver, a circuit arrangement for amplitude limiting impulsive interference on the received television waveform, which interference extends beyond the useful white level modulation on the waveform, comprising a video amplifier tube having an anode voltage/grid voltage characteristic similar to that of a pentode, a high tension supply, means for applying potentials from said high tension supply to said valve enabling said valve to employ that characteristic to operate as a limiter for limiting said impulse interference on the television waveform to a certain level as well as to produce an output video signal, an automatic gain control circuit fed with the output signal from said video amplifier and including means for sampling said television waveform during a part of the signal of which the amplitude varies solely in proportion to changes in the signal strength and means for deriving an automatic gain control voltage from said sampled portions, means connecting a contrast control to said high tension supply which operates to vary a D.C. voltage applied to said video amplifier, means for feeding variations in the D.C. voltage of said video amplifier to alter the reference voltage applied to the automatic gain control circuit such that the white level of the waveform at the input of the video amplifier is kept substantially constant as the contrast is altered, a cathode ray tube, means for feeding the output of said video amplifier to modulate the electron beam of said cathode ray tube to produce a picture thereon, and means for feeding the variations in the D.C. voltage applied to the video amplifier to an electron beam modulating electrode of the cathode ray tube so that the picture black level is maintained at all settings of the contrast control.

7. In a television receiver, a circuit arrangement for amplitude limiting impulsive interference on a erceived television waveform, which inteference extends beyond the useful modulation on the waveform, comprising a video amplifier valve having an anode voltage/grid voltage characteristic similar to that of a pentode, a high tension supply, means for applying potentials from said high tension supply to said valve enabling said valve to employ that characteristic to operate as a limiter for limiting said impulsive interference on the television waveform to a certain level as well as to produce an output video signal, an automatic gain control circuit fed by the output signal from said video amplifier and including means for sampling the television waveform during parts thereof which vary solely in proportion to changes in the received signal strength, and means for producing an automatic gain control voltage from said sampled portions, means connecting a contrast control to said high tension supply and to said video amplifier for varying the grid bias thereon, and means for feeding a voltage derived from said automatic gain control circuit and responsive to alterations in the grid bias applied to said video amplifier for compensating for changes in the limiting level of the video amplifier caused by said alterations in the grid bias thereof.

8. In a television receiver, a circuit arrangement for amplitude limiting impulsive interference on a received television waveform, which interference extends beyond the useful modulation on the waveform, comprising a video amplifier valve having an anode voltage/grid voltage characteristic similar to that of a pentode, a high tension supply, means for applying potentials from said high tension supply to said valve enabling said valve to employ that characteristic to operate as a limiter for limiting said impulsive interference on the television waveform to a certain level as well as to produce an output video signal, an automatic gain control circuit fed by the output signal from said video amplifier and including means for sampling the television waveform during the synchronising pulses and means for producing a D.C. automatic gain control voltage from said sampled portions, means connecting a contrast control to said high tension supply and to said video amplifier for varying the grid bias thereon and means for feeding a voltage derived from said automatic gain control circuit and responsive to alterations in the grid bias applied to said video amplifier for compensating for changes in the limiting level of the video amplifier caused by said alterations in the grid bias thereof.

9. In a television receiver, a circuit arrangement for amplitude limiting impulsive interference on a received television waveform, which interference extends beyond the useful modulation on the waveform, comprising a video amplifier valve having an anode voltage/grid voltage characteristic similar to that of a pentode, a high tension supply, means for applying potentials from said high tension to said valve enabling said valve to employ that characteristic to operate as a limiter for limiting said impulsive interference on the television waveform to a certain level as well as to produce an output video signal, an automatic gain control circuit fed by the output signal from said video amplifier and including a diode, means for feeding sampling pulses to said diode for sampling the television waveform during the synchronising pulses and a rectifier for producing a D.C. automatic gain control voltage from said sampled portions, means connecting a contrast control to the high tension supply and in the control grid circuit of said video amplifier for varying the grid bias thereon, and means for feeding a voltage derived from said automatic gain control circuit and responsive to alterations in the grid bias applied to said video amplifier for compensating for changes in the limiting level of the video amplifier caused by said alterations in the grid bias thereof.

References Cited in the file of this patent

UNITED STATES PATENTS 2,302,520 Bingley ---------------- Nov. 17, 1942
2,631,230 Marsh ----------------- Mar. 10, 1953
2,854,507 Berkhout --------------- Sept. 30, 1958
2,855,458 Rogers ----------------- Oct. 7, 1958